(No Model.)
J. G. SMITH.
TELEPHONE CALL.
No. 553,364. Patented Jan. 21, 1896.
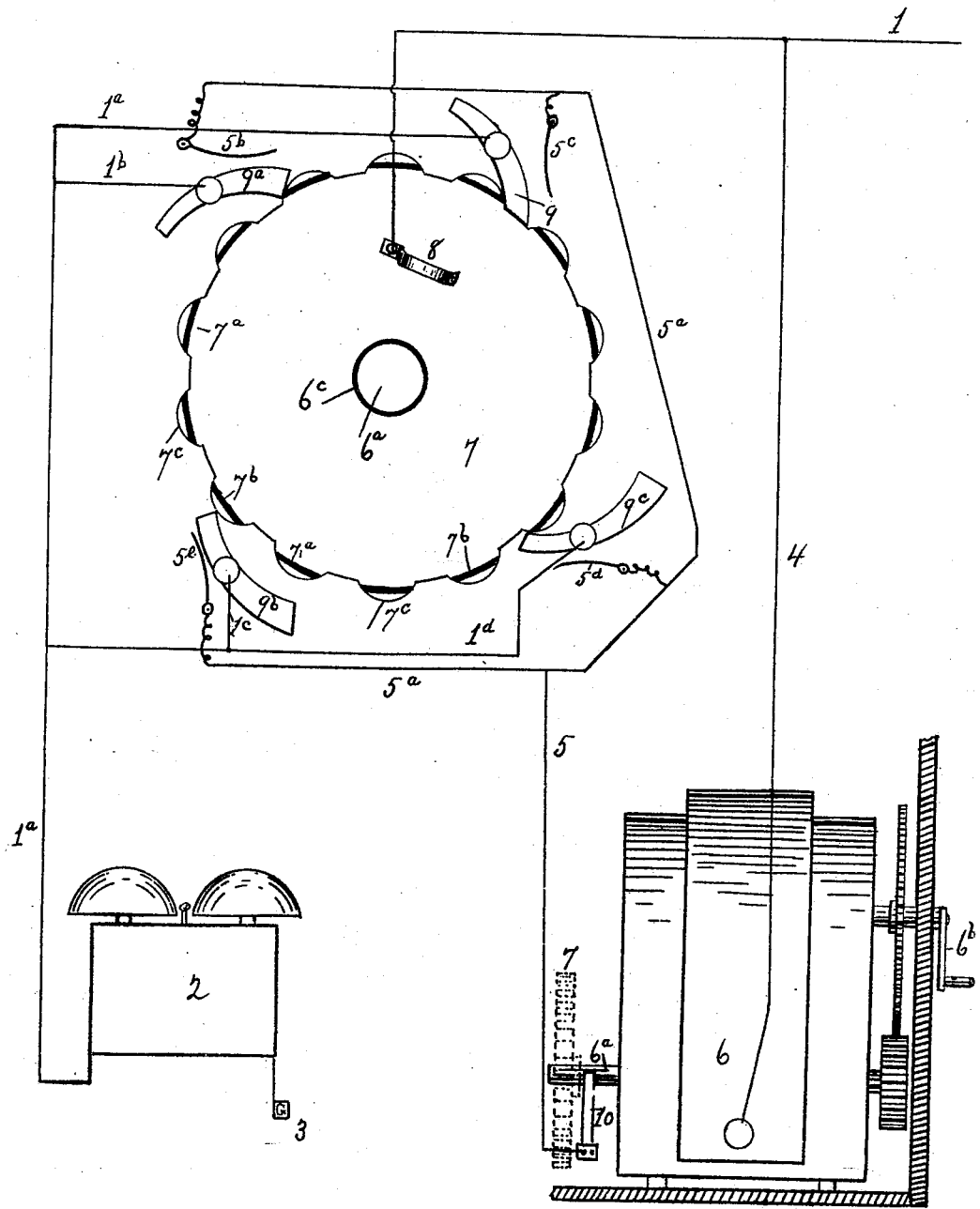
WITNESSES:
INVENTOR
Jas. G. Smith
BY
T. F. Bourne
his ATTORNEY.

UNITED STATES PATENT OFFICE.

JAMES G. SMITH, OF NEW YORK, N. Y., ASSIGNOR OF TWO-THIRDS TO ROBERT G. VASSAR AND CHARLES B. SMITH, OF SAME PLACE.

TELEPHONE-CALL.

SPECIFICATION forming part of Letters Patent No. 553,364, dated January 21, 1896.

Application filed August 17, 1895. Serial No. 559,582. (No model.)

*To all whom it may concern:*

Be it known that I, JAMES G. SMITH, a resident of New York city, county and State of New York, have invented certain new and useful Improvements in Telephone-Calls, of which the following is a specification.

My invention relates to that class of telephone calling systems wherein a magneto or dynamo electric machine is used to send an impulse to a signaling-instrument; and the invention has for its object to so arrange the system that the main line will be normally closed through a signaling-instrument and the magnets will be normally broken from the main line; but when the magneto is operated the said main line will be broken and the magneto will be placed in the circuit of the main line.

The invention consists in a main line having a signaling-instrument, a magneto or dyanamo electric machine located on a normally-open spur-circuit leading from the main line and means for opening or breaking said main line and introducing said spur-circuit, including said magneto, into said main line.

The invention further consists in the combination of a magneto or dynamo electric machine with a toothed or notched wheel and one or more contacts adapted to be operated by said wheel and arranged to make and to break a circuit for said magneto.

The invention also consists in the novel details of improvement and the combinations of parts that will be more fully hereinafter set forth, and then pointed out in the claims.

Reference is to be had to the accompanying drawing, forming part hereof, which is a partly diagrammatic view illustrating my invention.

In the accompanying drawing, the numeral 1 indicates a main line or circuit, with which is connected a signaling-instrument or call-bell 2 of suitable construction. The main line 1 is normally closed through the instrument 2 to ground 3.

4 5 is a normally-open spur-circuit leading from the main circuit, and 6 is a suitable magneto or dynamo electric machine located on said spur-circuit. Said magneto is then normally broken from the main line, but is adapted to be placed in circuit therewith when operated to send an impulse over the main line 1.

The arrangement of the system is such that when the magneto is operated the main circuit will be broken and the spur-circuit will be closed around the break in the main circuit, and for this purpose I have shown the following arrangement: 7 is a toothed or notched wheel shown rigidly carried by the shaft $6^a$ of the armature of the magneto 6, and insulated therefrom, as shown, as by insulation $6^c$; but this wheel can be otherwise carried and rotated if desired. The main line 1 is normally connected with the wheel 7, as by a contact 8, and is normally complete through the instrument 2 to ground 3 through a wire $1^a$, which connects with a movable contact 9, which is adapted to make electrical connection with the wheel 7, as shown. By preference there are a number of similar contacts $9^a$ $9^b$ $9^c$, all adapted to make contact with the main part of wheel 7, but so arranged that at least one will be in contact therewith when the wheel is at rest. The teeth or projections $7^a$ of the wheel 7 are provided with insulation $7^b$, which is preferably capped by metal pieces $7^c$ to take the wear from said teeth. By this means when said teeth or projections engage the movable contacts electrical engagement is broken with the wheel 17. The several movable or pivoted contacts $9^a$ $9^b$ $9^c$ are connected with the wire $1^a$, as by spur-wires $1^b$ $1^c$ $1^d$, which may be suitably arranged for the purpose. The contacts 9, $9^a$, $9^b$, and $9^c$ are preferably weighted so as to normally hold them against the wheel 7 or its teeth, as shown, although springs could be used for this purpose if preferred.

With the arrangement above described when the wheel 7 is at rest the normal circuit of the line 1 will be through contact 8, wheel 7, one of the movable contacts which happens to be in engagement with the said wheel, and thence to the wire $1^a$ to ground 3 through the instrument 2; but as soon as the wheel 7 is rotated its teeth will bear against all the movable contacts 9 $9^a$, &c., and thus keep them raised from the body of wheel 7 during the rotation of said wheel, so that the main-line circuit will then be broken. At this time the open spur-circuit 4 5 of the magneto or dynamo electric machine 6 is to be brought into electrical connection with the main circuit around the break therein. This is accomplished as follows: The wire 4 leads to one terminal of the magnet and the wire 5 connects with a commutator or brush 10, which makes normal connection with the armature or shaft $6^a$ of the magneto. The wire 5 thence leads to a wire $5^a$, with which are connected spring-contacts $5^b$, $5^c$, $5^d$, and $5^e$, which are so placed as to be normally out of engagement with the movable contacts 9 $9^a$, &c., but can be adjustable to cause proper contact with the movable contacts. When, however, the wheel 7 is rotated its teeth or projections will cause the movable contacts to move outwardly sufficiently far, owing to the blow that said teeth give said contacts 9 $9^a$, &c., to cause engagement of said contacts with the spring-contacts $5^b$ $5^c$, &c., whereupon the circuit will be closed from 1, through 4, 10, 5, and $5^a$ to one or more of the spring-contacts and thence through the corresponding movable contact or contacts to the wire $1^a$ of the main line, thus completing the main circuit through the magneto or dynamo electric machine. The speed of rotation of wheel 7 should be sufficient to insure constant contact between one contact 9 or $9^a$, &c., and a contact 5 or $5^a$, &c.

From the foregoing description it will be understood that when the crank $6^b$ of the magneto 6 is rotated rotary motion will be communicated to the toothed wheel 7, whereupon its teeth or projections will cause the contacts 9 $9^a$, &c., to move outwardly, thus breaking the main circuit through the wheel 7, while at the same time said movable contacts will be given sufficient throw to cause them to make engagement with the respective spring contact or contacts $5^b$ $5^c$, &c., thus closing the spur-circuit 4 5 and placing the magneto in the main circuit to operate the signaling-instrument 2 or instruments on the line. When the operation of the magneto ceases, all of the movable contacts will cease to make engagement with the spring-contacts $5^b$, &c., and one of the movable contacts will pass in between the teeth $7^a$ and make contact with the body of the wheel 7 to re-establish the normal circuit of the main line.

I have shown the wheel 7 and its connected parts in diagram to more clearly illustrate the features and circuits; but the wheel 7 is also shown in dotted lines on the shaft $6^a$ of the magneto to illustrate the position of said wheel in connection with the magneto. It will be further understood that in accordance with my invention a through-line is normally maintained, and that when the magneto is operated it is included in the main circuit by the breaking of the main circuit and the simultaneous closing of the normally-open spur-circuit, and that as soon as the operation of the magneto ceases the spur-circuit is broken and the break in the main circuit closes, which effects are accomplished by the wheel 7 and movable contacts 9 $9^a$, &c.

Of course, instead of having grounds at the ends of the main circuit a return-wire or closed metallic circuit can be used.

Having now described my invention, what I claim is—

1. A calling system comprising a main circuit, a normally open spur circuit leading therefrom, a magneto or dynamo electric machine located on said spur circuit, a toothed wheel and a vibratory or oscillatory switch arranged to be continuously vibrated or oscillated during a single rotation of said wheel to close said spur circuit to introduce the magneto or dynamo electric machine into said main circuit.

2. A calling system comprising a normally closed main circuit, a normally open spur circuit leading therefrom, a magneto or dynamo electric machine located on said spur circuit, a toothed wheel and a plurality of vibratory or oscillatory switches arranged to be continuously vibrated or oscillated during the rotation of said wheel to break said main circuit and to close said spur circuit to introduce the magneto or dynamo electric machine into the main circuit.

3. The combination with a magneto or dynamo electric machine, of a toothed or notched wheel to be operated thereby, and a vibratory or oscillatory switch or contact arranged to be continuously vibrated or oscillated by the teeth of said wheel during a single rotation of said wheel.

4. The combination of a magneto or dynamo electric machine, with a toothed or notched wheel operated thereby, and one or more movable contacts arranged to make electrical contact therewith when at rest to establish a circuit, and insulation carried by the wheel to break electrical contact between said wheel and the movable contact when the speed of rotation of said wheel is sufficient to cause its teeth to keep the movable contact out of engagement with the body of the wheel.

5. In a signaling system, a main circuit, a toothed wheel connected with one portion thereof, a movable contact connected with the other portion of said circuit and normally engaging said wheel when the latter is at rest and arranged to be moved by the teeth of said wheel when the latter rotates, a spur circuit leading from said main circuit, a contact connected with said spur circuit and normally out of engagement with said movable contact and arranged to be engaged thereby when said wheel is turned, and a magneto or dynamo electric machine connected with said spur circuit and arranged to operate said toothed wheel.

6. In a signaling system, a main line, a toothed wheel, a contact connecting said line with said wheel, a movable contact normally engaged with said wheel and connected with the other portion of the main line, a spur circuit connected with the main line and having a contact arranged to be engaged by the movable contact when the wheel rotates, a magneto or dynamo electric machine included in said spur circuit, the spur circuit having a connection to the armature of the magneto, said toothed wheel being carried by and insulated from said armature or its shaft.

7. In a signaling system, a main circuit having a plurality of movable contacts connected with it at one part, a toothed wheel also connected with said main circuit and normally in electrical engagement with one of said movable contacts, said contacts being so arranged that one of them will always be in engagement with said wheel when the latter is at rest, a spur circuit leading from said main circuit and having a plurality of contacts arranged to be engaged by said movable contacts when the latter are moved by said wheel, and a magneto or dynamo electric machine arranged to actuate said wheel.

JAMES G. SMITH.

Witnesses:
W. S. TISDALE,
T. F. BOURNE.